US006771982B1

(12) United States Patent
Toupin

(10) Patent No.: US 6,771,982 B1
(45) Date of Patent: Aug. 3, 2004

(54) SINGLE ACTION AUDIO PROMPT INTERFACE UTLIZING BINARY STATE TIME DOMAIN MULTIPLE SELECTION PROTOCOL

(75) Inventor: Paul M. Toupin, Kelowna (CA)

(73) Assignee: Curo Interactive Incorporated, Kelowna (CA)

( * ) Notice: Subject to any disclaimer, the term of this patent is extended or adjusted under 35 U.S.C. 154(b) by 832 days.

(21) Appl. No.: 09/686,854

(22) Filed: Oct. 12, 2000

Related U.S. Application Data

(60) Provisional application No. 60/160,637, filed on Oct. 20, 1999.

(51) Int. Cl.[7] .................................................. H04B 1/38
(52) U.S. Cl. ....................... 455/557; 455/563; 455/66.1; 455/564; 455/575.1; 455/90.2; 704/231; 704/271
(58) Field of Search .............................. 455/66.1, 557, 455/563, 564, 568.1, 569.1, 575.1, 90.1–90.3; 704/231, 211, 267, 272; 446/140–142, 404, 297; 380/247, 250

(56) References Cited

U.S. PATENT DOCUMENTS

| | | | |
|---|---|---|---|
| 4,696,653 A | | 9/1987 | McKeefery |
| 4,707,855 A | | 11/1987 | Pasinski et al. |
| 4,864,607 A | | 9/1989 | Mitamura et al. |
| 4,866,765 A | | 9/1989 | Yang |
| 5,011,449 A | | 4/1991 | Handy et al. |
| 5,345,226 A | | 9/1994 | Rice, Jr. et al. |
| 5,474,484 A | | 12/1995 | Lemelle |
| 5,553,121 A | * | 9/1996 | Martin et al. ............. 379/88.01 |
| 5,562,453 A | * | 10/1996 | Wen ............................ 434/185 |
| 5,746,602 A | | 5/1998 | Kikinis |
| 5,884,257 A | | 3/1999 | Maekawa et al. |
| 5,897,042 A | * | 4/1999 | Sims ........................... 224/576 |
| 6,010,339 A | * | 1/2000 | McDonald ................... 434/258 |
| 6,012,030 A | | 1/2000 | French-St. George et al. |
| 6,018,711 A | * | 1/2000 | French-St. George et al. ......... 704/275 |
| 6,064,421 A | | 5/2000 | Pohl |
| 6,104,292 A | * | 8/2000 | Rombom et al. ......... 340/573.1 |
| 6,193,579 B1 | * | 2/2001 | Mak ............................ 446/297 |
| 6,196,893 B1 | * | 3/2001 | Casola et al. ............... 446/297 |
| 6,459,910 B1 | * | 10/2002 | Houston ...................... 455/563 |
| 2001/0031605 A1 | * | 10/2001 | Kondo et al. ............... 446/484 |
| 2002/0061702 A1 | * | 5/2002 | Dan et al. ................... 446/175 |

FOREIGN PATENT DOCUMENTS

| | | |
|---|---|---|
| CA | 2149012 | 9/1997 |
| DE | 40 08 598 | 9/1991 |
| EP | 0477688 | 4/1992 |
| FR | 2775407 | 8/1999 |
| JP | 2270447 | 11/1990 |
| JP | 7007538 | 1/1995 |
| JP | 11194798 | 7/1999 |
| JP | 11205430 | 7/1999 |
| WO | WO 8707460 | 12/1987 |
| WO | WO 9712361 | 4/1997 |
| WO | WO 97/41936 | 11/1997 |
| WO | WO 9917854 | 4/1999 |
| WO | WO 00/51697 | 9/2000 |

* cited by examiner

*Primary Examiner*—Nay Maung
*Assistant Examiner*—Edan Orgad
(74) *Attorney, Agent, or Firm*—Antony C. Edwards

(57) ABSTRACT

An interface protocol for the functional manipulation of complex devices such as personal telecommunication devices without the necessity of the visual feedback via textual or graphic data, wherein the sensor functions change with time rather than placement, so that a user action biases a binary state switch, which is correlated to a timed audible audio data stream, the correlation indicating the desired action selected by the user. The device can be embedded in a product such as a plush toy without altering the external aesthetics of the product.

24 Claims, 14 Drawing Sheets

Schematic illustration of components (Figure 2)

Sequence of events ( Figure 3 )

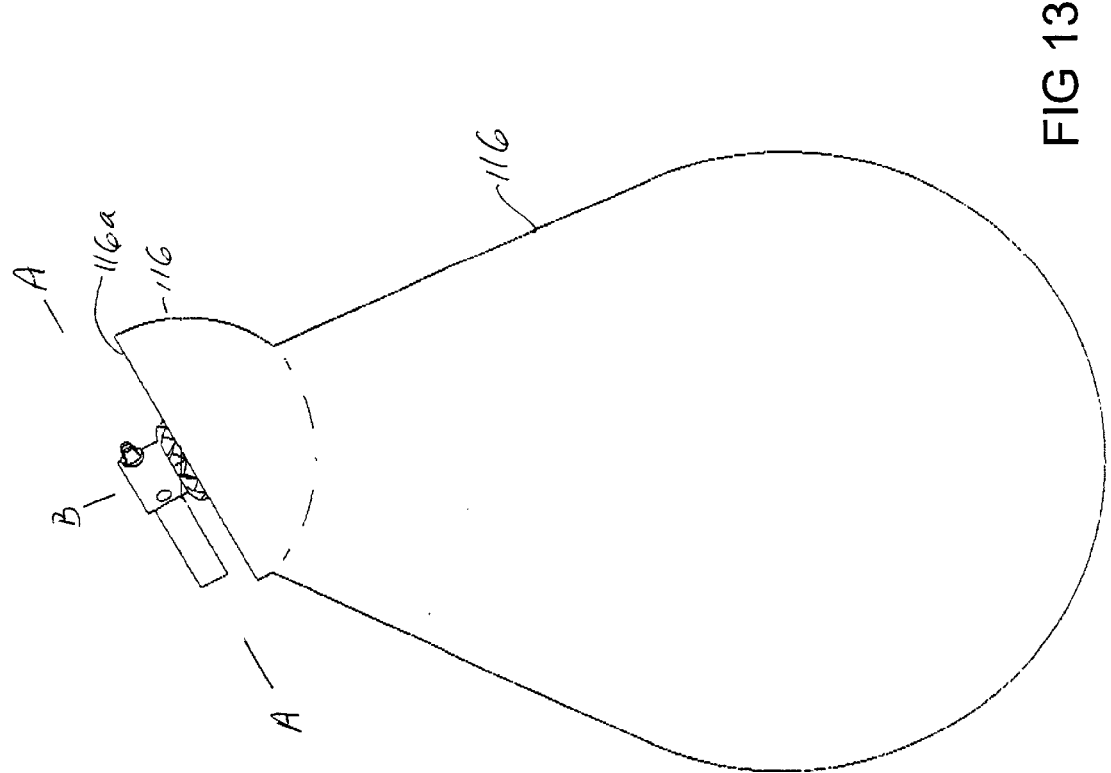

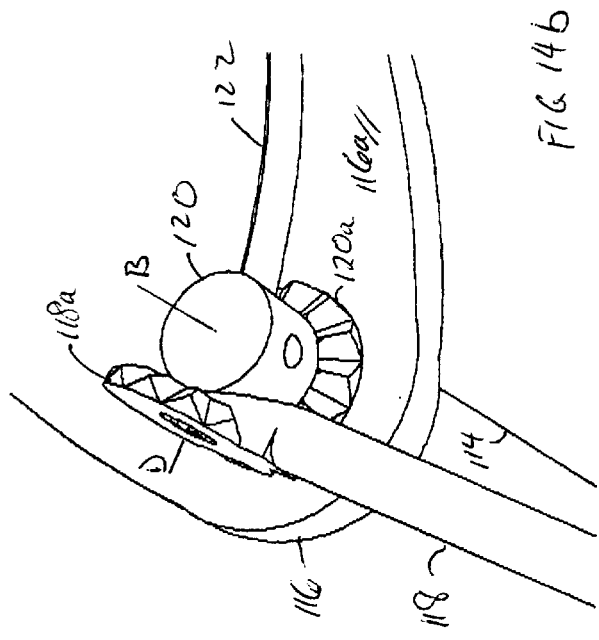
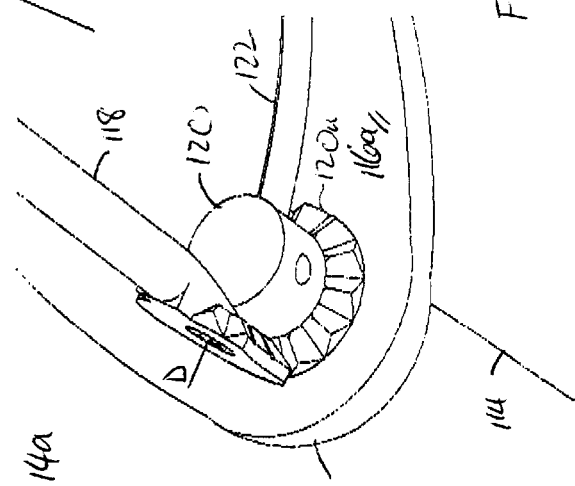
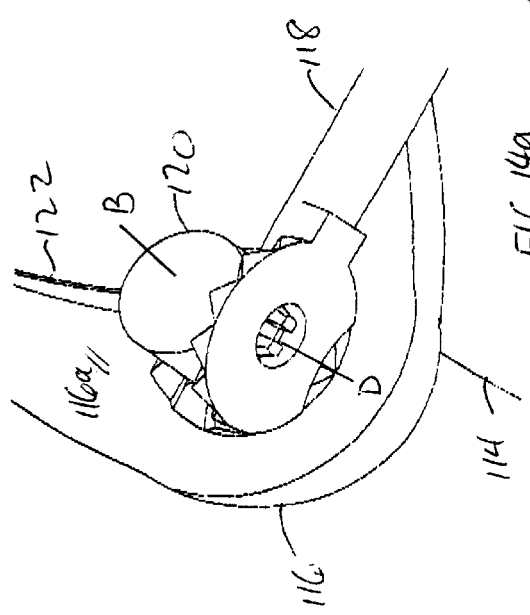

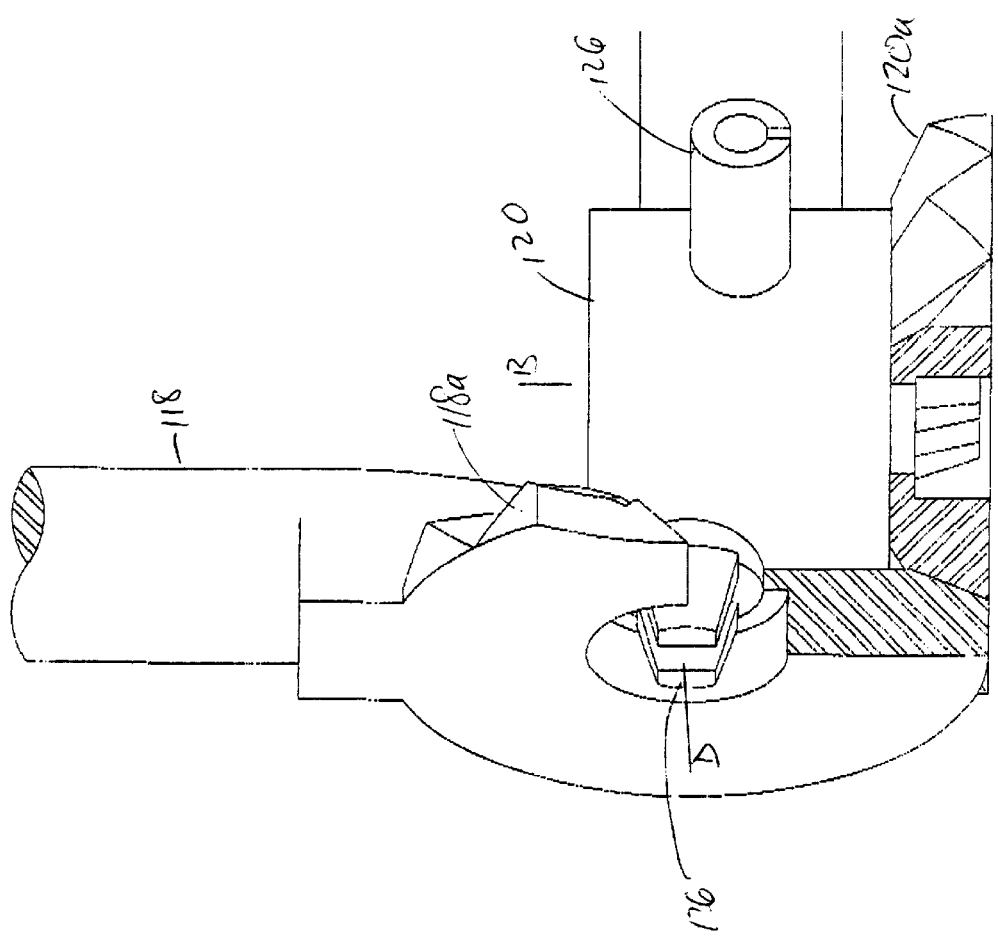

SINGLE ACTION AUDIO PROMPT INTERFACE UTLIZING BINARY STATE TIME DOMAIN MULTIPLE SELECTION PROTOCOL

CROSS REFERENCE TO RELATED APPLICATION

This application claims priority from U.S. Provisional Patent Application No. 60/160,637 filed Oct. 20, 1999 titled Single Action Audio Prompt Interface Utilising Binary State Time Domain Multiple Selection Protocol.

FIELD OF THE INVENTION

This invention relates to a user interface method for personal communication devices that operates using audio prompts, simple binary state sensors and timing circuitry. The user interface guides the user through option menus and the selection process.

BACKGROUND

This invention has been designed to solve problems presented by conventional user interfaces in consumer electronic products. It relates to a process and the configuration of apparatus that can accurately and automatically interpret the user's desired selection without the requirement that the user be able to read. One aspect of the interface of the present invention resides in its ease of use, especially for children, for illiterate people and people less technically able. The device can be embedded inside almost any product but the preferred embodiment is directed to telecommunication devices such as cell phones embedded in a product, without affecting the external aesthetics of the product.

Applicant is aware of prior art within the field of user interfaces for consumer electronic products, for example interfaces employing voice recognition, graphic touch panels, and intelligent keypads. Such prior art user interfaces for consumer electronic products consist of a broad range of technology mixes. The current trend is to use a more organic style of interface such as voice recognition or graphical interfaces rather than arrays of mechanical buttons. Some devices attempt to guess a user's most probable decisions, making navigating complex decision trees more tolerable. The present invention is derived out of necessity for an easy-to-use interface that may be embedded in a plush toy and operate without a keypad or display, which would detract from the aesthetics of the plush design of such a toy. As far as applicant is aware, only voice recognition is a viable contender for the desired application of the present invention in that voice recognition does not alter the external aesthetics of a product in which the device is embedded. The current limitations of voice recognition technology make it less well suited for the design of the present invention unless used only as a binary state device as better described below.

One object of this invention is to provide an alternative method of operating complex electronic equipment such as cellular or wireless telephones or other personal communication devices, wherein audio prompts guide the user through options, and the user responds with a timely action to accept or reject the specific option presented during a corresponding time window.

It is a further object of the present invention to provide an audible audio prompted, binary sensor interface for a consumer electronic device, for example, personal communications devices wherein such a device might be unintrusively or unobviously embedded in a soft toy for operation by a child.

It is yet a further object of the present invention to provide a wireless telephone embedded within plush doll/toy or the like, wherein arm or leg position indicates function including telephone functions such as (a) whisper mode, where the hands/paws are together cupping the mouth;

(b) broadcast speak mode, where the arms/legs are wide; and, (c) standby mode, where the hands/paws are together in front; and wherein squeezing the ears or other appendage controls volume, hugging/squeezing indicates input, or shaking the doll/toy causes giggling by the doll/toy to indicate that power is on.

SUMMARY

In the present invention, the user of a telecommunication device is presented with an action, an option or a series of options via audio messages. The user indicates acceptance or rejection of an option with a timely action, such as pressing a button disguised within a product such as a plush doll. The timely action must occur during the time window in which the audio message implicitly or explicitly indicates the intention to accept or reject an option. Otherwise, the interface indicates the default selection to the device. The interface is thus well adapted for use by a child, or for example by a visually impaired person, or even merely for use by people who are driving automobiles and should not be taking their eyes from the road ahead.

The invention is thus, in one aspect, a process of navigating menus or selecting actions or options. The process utilises a sensor system configured to behave as a binary state switch along with an audio presentation and feedback system. These two elements are synchronised to permit correlation analysis of signals, which yields information or signals that indicate the user's selected option or desired action.

The novelty lies, at least in part, in the ability of a binary device, such as a push button, to select one of multiple options by indicating the option as desired or undesired as they are presented through time via speech. Acceptance or rejection is indicated by the presence of one or the other of the two possible binary states during the corresponding time window.

The binary state switch could be a push button switch, a microphone with audio detection processing, a motion sensor, a light detector, a rotary encoder, voice recognition processing or any other devices or processes configured to be a binary state indicator, either in singularity or plurality.

The selection time window can be within the time domain of spoken words or sounds of the prompt, which may include quiet time and may also include, or consist only of, other audible queues or music.

This interface protocol permits functional manipulation of complex devices, such as personal telecommunication devices without the necessity of the visual feedback via textual or graphic data. Since the sensor functions change with time rather than placement, both visual and tactile demands placed upon the user are dramatically reduced, offering an advantage over the complex array of graphic symbols and the symbolic placement of buttons found on multifunction keypads. In the present invention an action is converted to a binary electrical impulse, which is correlated to a precisely timed audible audio data stream. The correlated data indicates the desired action or option selected by the user. This allows a device such as a telecommunication device to be embedded in a product without altering the external aesthetics of the product. The product can be, but is not limited to, a plush toy. In some cases, the ability to be hidden within the product will be an essential component of the invention's application.

In a further aspect, the present invention is a communication protocol that defines the parameters of actions, data transfer, acknowledgment and response for the purpose of a user interface in a consumer electronic device. The user/operator listens to a stream of audio messages that indicate available options. The user selects an action, an option or an optional path through a menu tree by biasing, such as toggling or otherwise reversing the state of the binary state device, so as to select the alternative choice, action or path available at that moment. Alternatively, the user makes no selection, which indicates acceptance of a default choice, direction or action.

In one embodiment, the audio stream may present an ongoing list during which the user intervenes to select the desired option. The default action in this embodiment may then be to merely present the next item in the list.

The present invention may be described as a binary state time domain multiple selection protocol in which a binary state indicates a selection by inversion of the binary state during the defined time window for the desired selection utilising mechanical, electromechanical and electronic circuitry. The present invention requires the presence of three key elements, a binary input mechanism, an audible output system and a method for keeping track of the state of the binary state input device as the messages are being presented. The user interface is a timing based multiple selection protocol consisting of mechanical, electromechanical and electronic circuitry for a novel method of making and selection from a menu or list of items.

Thus, in summary, the present invention consists of a binary state, time domain, multiple selection protocol in which a binary state indicates selection of an option by inversion of the binary state during the defined time window for the desired action or option. The action or option is presented in an audible audio information stream that is precisely timed or synchronised with the monitoring of the binary state sensors to allow electronic signals to indicate and be processed in such a manner as to yield information regarding the user's choice.

The audio stream presents a series of actions or options from which the user may select an option via any binary state indicator, such as a push button switch. The device may also operate with a limited binary state voice recognition interface. A preset default option is assumed unless indicated by reversing the state of the indicator during the time domain of presentation of information pertaining to the desired option. Presented information is any audio information that could be used to indicate the nature of an option and its selection time frame.

The configuration of electronic components, circuitry, mechanical or electromechanical sensors and/or computer software/firmware for providing information to the user and the host system regarding the user-desired action or option uses such physical resources and time stamping to determine the user's activity and report information via an electronic or mechanical signal that a processor can process as a specific action or intent.

A device incorporating the present invention may operate while embedded in another product, without altering the external aesthetics of the product, and without visually disclosing the embedded functionality. The product may be a soft or flexible toy such as a plush doll or figure.

Put another way, the present invention may be summarized as an audio prompted telecommunication interface device using a binary state time domain multiple selection protocol wherein the device includes:

(a) a telecommunication device housing, (b) a processor and cooperating memory and a power supply mounted in the housing, (c) an audio broadcaster mounted in the housing and cooperating with the processor for audibly broadcasting outside of the housing a sequenced series of audible prompts supplied by the processor to the audio broadcaster, (d) a binary state input switch mounted in the housing for receiving binary state input from a user, the input for binary biasing of the input switch between opposite binary states in response to a single prompt of the series of audible prompts, (e) a timer cooperating with the processor, the processor correlating the response to the single prompt with a corresponding single time domain within a sequential series of time domains timed by the timer, and (f) the processor correlating the single time domain with the single prompt and executing a single action corresponding to the single prompt according to an instruction set in the memory, wherein, if the single action is a telecommunication action, the processor executing the single action in further cooperation with a telecommunication transceiver mounted in the housing.

Advantageously, the device housing has a flexible surface and the input receiver is mounted beneath the flexible surface. The device housing has an audio transmitting surface and the broadcaster is mounted beneath the audio transmitting surface. The device housing may be a soft toy such as a plush toy.

In one aspect of the present invention, the plush toy may have at least one appendage. Such an appendage would be pivotally mounted to a body of the plush toy. The appendage cooperates with the processor so that a first position of the appendage relative to the body switches the processor into a stand-by mode, and a second position of the appendage relative to the body switches the processor into an active mode so as to trigger the series of prompts. Advantageously the appendage is an opposed pair of elongate appendages such as arms, legs or the like. The pair of appendages may pivot relative to the body between a resiliently clamped, closed position wherein the appendages are adjacent, and a spread position wherein the pair of appendages are spaced apart. The first position may be the closed position and the second position may be the spread position.

In one embodiment, the first and second positions lie substantially in a first plane. In a third position the pair of appendages are elevated out of the first plane. In the second position the audio broadcaster audibly transmits at a first audible volume and in the third position the audio broadcaster audibly transmits at a second audible volume, wherein the first audible volume may be greater than the second audible volume. In the third position the ends of the arms, which may be shaped as hands, cup a mouth of the plush toy. In this embodiment the audio broadcaster may be mounted behind the mouth of the plush toy. When the ends of the arms are hands in the first position the hands are together in front of the plush toy, and in the second position the hands are widely spread apart.

In a further aspect of the present invention the input switch is a push-button switch, and the series of audible prompts are prompts in a multi-level menu tree. The input switch may also be the microphone in conjunction with software to detect any audible response versus no audible response, the audible response biasing the binary switch to its opposite binary state. The series of audible prompts may comprise a sequentially audibly broadcast list of names from a list of names in the memory, wherein the single prompt is a single name from the list and the single action corresponding to the single name is to dial a telephone number, from a corresponding list of telephone numbers, corresponding to the single name. Advantageously the list of names may be statistically ordered based on frequency and time of calling by the user so as to present first numbers most likely to be called. In one preferred embodiment, the input button switch may be biased a plurality of times in rapid succession and the action corresponding to the single action is different depending on the number of times the input switch is biased in rapid succession. In another preferred embodiment the speed of audible presentation of the prompts may be increased by compressing the audio data in the prompts, and in such a case the prompts may be sped-up in an adaptive feedback loop so as to increase the presentation speed until user mistake meet a threshold cut-off level.

The method of the present invention comprises the steps of:

(a) audibly broadcasting outside of the housing from the broadcaster a sequenced series of audible prompts supplied by the processor to the audio broadcaster, (b) receiving binary state input to the input receiver from a user, the input binary toggling the binary state input receiver in response to a single prompt of the series of audible prompts, (c) timing, by the timer, a sequential series of time domains, (d) correlating, by the processor, the response to the single prompt with a corresponding single time domain within the sequential series of time domains, (e) correlating, by the processor, the single time domain with the single prompt, and (f) executing a single action corresponding to the single prompt according to an instruction set in the memory.

BRIEF DESCRIPTION OF THE DRAWINGS

Aspects of the present invention are illustrated, merely by way of example, in the accompanying drawings in which:

FIG. 13 is, in side elevation partially cut-away view, the housing and endoskeleton of FIG. 12.

FIG. 14a is an enlarged cut-away view taken from FIG. 9.

FIG. 14b is an enlarged cut-away view taken from FIG. 10.

FIG. 14c is an enlarged cut-away view taken from FIG. 11.

FIG. 15 is an enlarged cut-away view of the pivotal arm strut mounting of FIG. 14c.

DETAILED DESCRIPTION OF PREFERRED EMBODIMENTS

Figure 1:
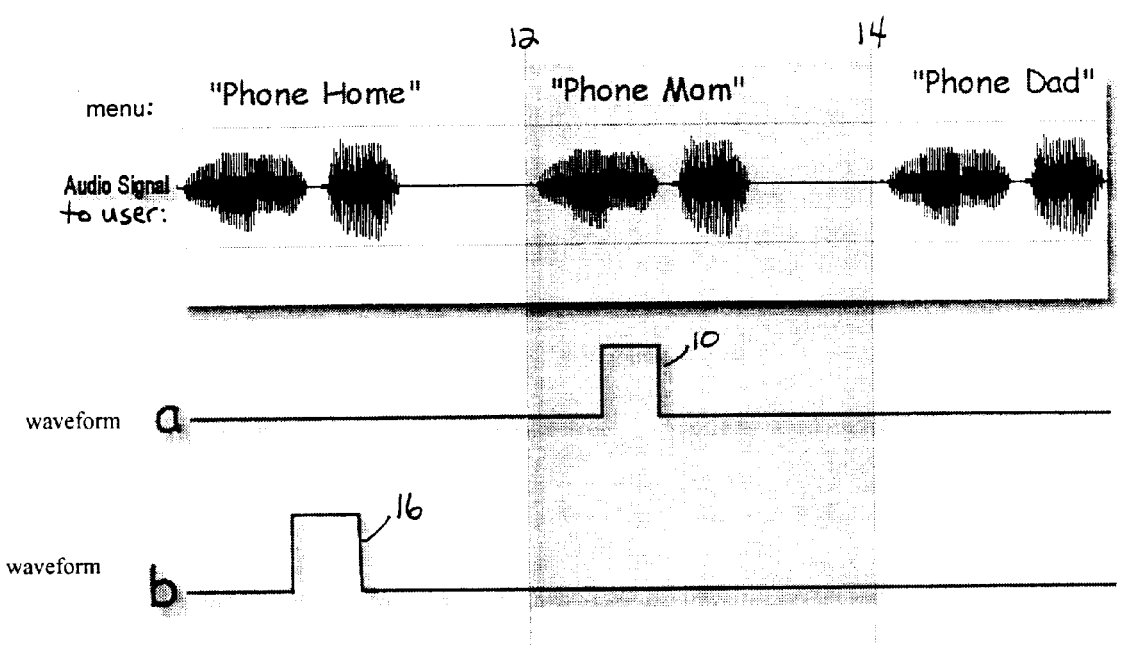
FIG. 1 is a signal timing diagram.
Figure 2:
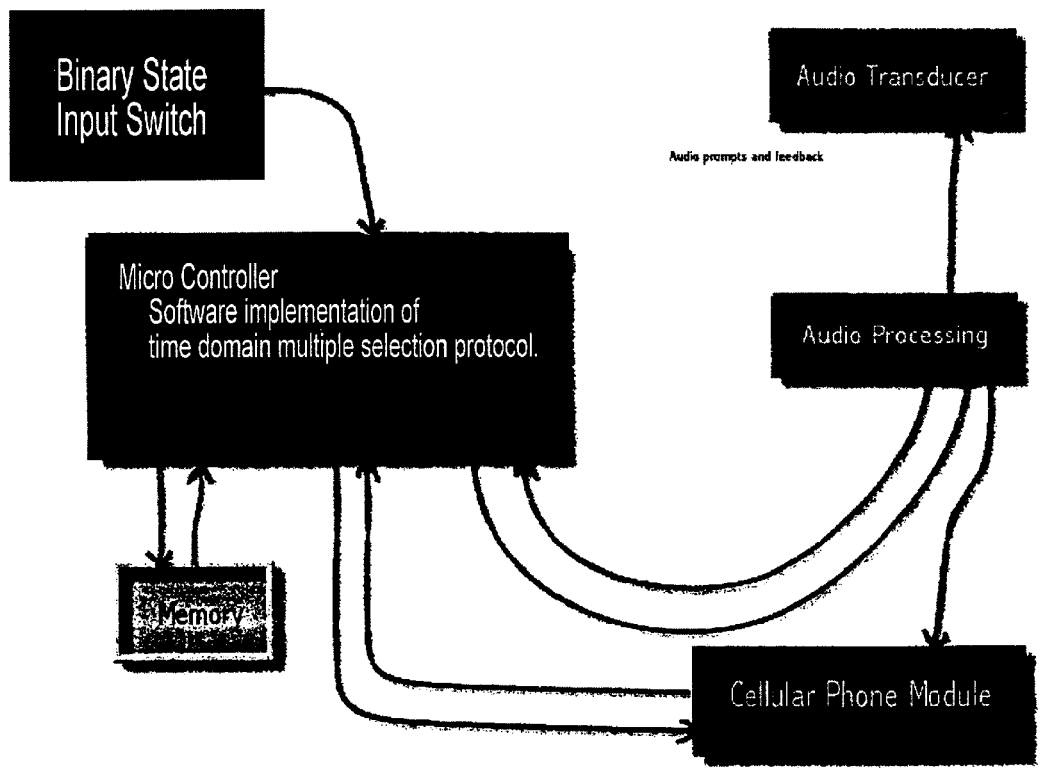
FIG. 2 is a schematic illustration of the components of one embodiment of the present invention.
Figure 3:
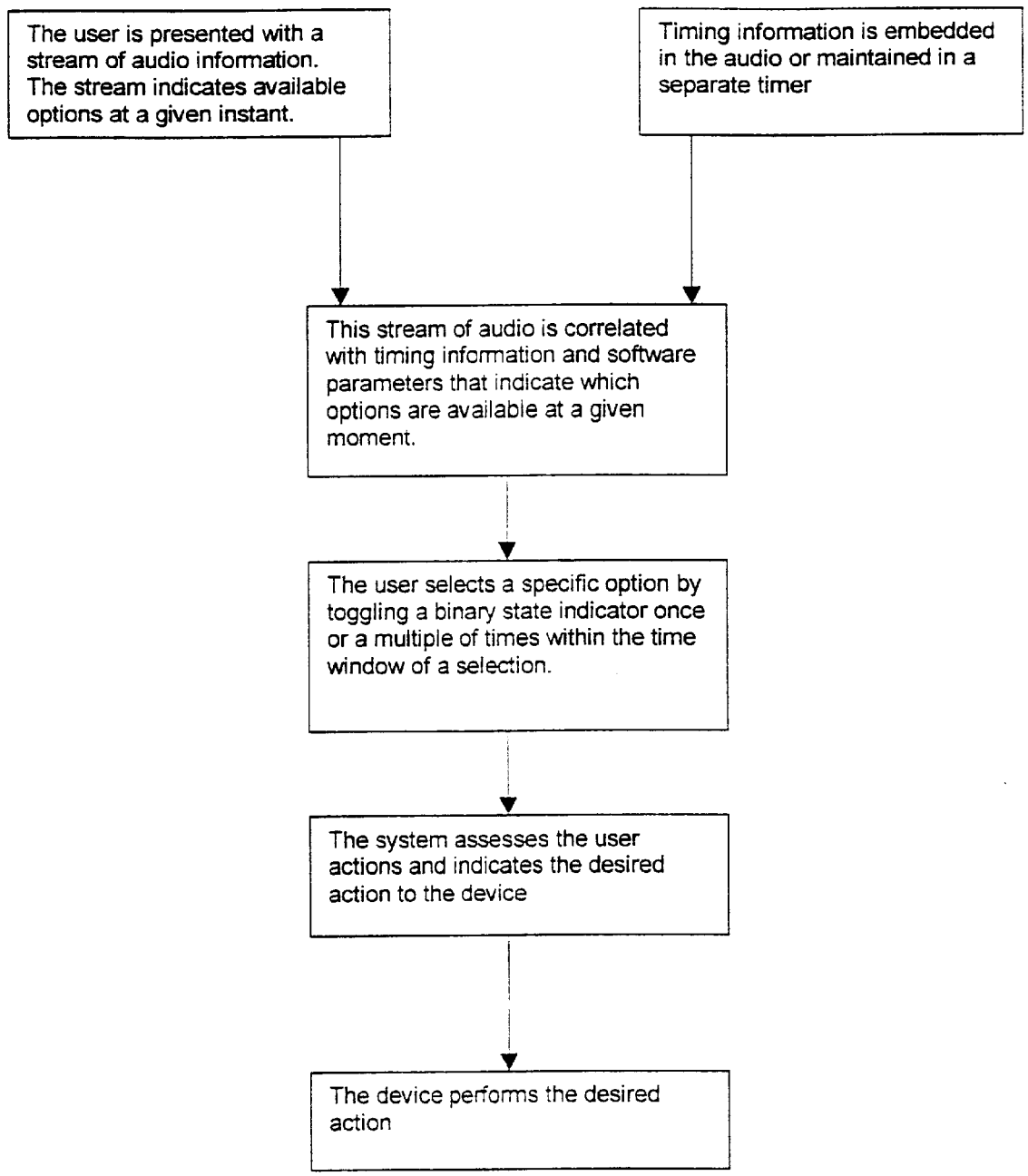
FIG. 3 is a sequence of events diagram.

With reference to the timing diagram of FIG. 1, the upper line describes an audio signal, that is, a plot of signal intensity over time. As a message is spoken or otherwise audibly broadcast to a user by a telecommunication device employing the interface of the present invention, the audible signal level increases as diagrammatically illustrated in the "audible signal" line and time transpires. The middle and lower lines indicates two of the three possible selections, so that in the case where the user desires to "phone mom", the user's timely input (for example by squeezing a flexible toy so as to toggle a push-button switch) would cause a waveform having a pulse within the "phone mom" selection time window. Thus, waveform "a" would result in a selection to phone mom. The pulse 10 indicating a state change could have occurred any time between time lines 12 and 14. The pulse 16 in waveform "b" is well outside the phone mom selection window and would make a different selection, in this case to "phone home". This is a simple example of the user interface of the present invention.

Users of this interface are not required to look at the telecommunication device during operation, eliminating the need for displays and the interpretation of visual symbols on buttons or graphics on the displays, and also eliminating components such as the keypads popular in the wireless telephone industry today. Also, the user's finger, or other selector, can maintain close proximity while making a selection, which makes the device easier, and in some conditions safer, to use.

The interface of the present invention is a departure from current interface design in its operational style, its elegance and simplicity. However, it does have its drawbacks. It tends to be slow compared to normal operation of a conventional keypad and is best suited to tasks that do not require the user to remember past actions. For example, entering long strings of numbers can be taxing for the user. The interface is only suitable for some products and, even then, only within limited markets. However its appeal is, firstly, in its ease-of-use and, secondly, that it can be embedded in a product without altering the external aesthetics of the product. The cosmetic impact is especially important when attempting to embed communications products such as wireless telephones into, for example, plush toys, without adversely affecting aesthetics.

A physical embodiment of the present invention requires three elements, namely:

(a) means, such as a processor (including associated memory), a microphone and a power supply, of generating and broadcasting a meaningful and audible audio stream which includes a sequential menu-tree series of prompts to direct the user's decision-making;

(b) a binary state switch that senses and transmits or applies a signal to the processor indicating a user input timed to denote the user's desired option; and, (c) a timing and correlating processor (which may be the same processor as in (a) above) that correlates in time audio presentation of the audio stream and user input signals.

At least three further processing features enhance operation of the interface of the present invention, namely:

(a) statistical ordering; that is, the processing of numbers such that the numbers that are most pertinent to the user are determined by statistical analysis based upon both call time and frequency;

(b) audio compression; that is, the process of compressing sounds so as to increase the speed of presentation of audible prompts (for example a sequential counting of numbers) in the time domain while maintaining essential message intelligence for the purpose of presenting more information in a given instant. This is desirable for use in a voice prompt based user interface for a personal communications device and may be accomplished by, for example, removing 40 percent of the digitized audio data without causing a sound frequency shift;

(c) adaptive feedback; that is, monitoring activities that are subliminal to the user but detectable to the system to control the nature of the user interface with the intention of making the user interface more effective for the user. The activities of most interest in are those that affect the speed of presenting or processing of information that is fast enough to keep interest and slow enough to be usable in a reliable manner. By using audio compression, as the user leaves, the speed of presentation of the prompts is increased until the processor detects an increase in user mistakes above a preset threshold; and, (d) pre-ring messaging so that an identifying name of a caller is audibly announced to the user (for example: "it's mom").

What follows is a detailed description of implementation of one embodiment of the interface of the present invention in the operation of a telecommunication device embedded in a plush toy. The plush toy is referred to herein as a "companion telecommunicator" such as it would be perceived by a child if the companion telecommunicator was a favourite plush doll. The programmed menu structure and logic flow that a user follows during operation of the companion telecommunicator are set out below. Appendix A hereto provides further detail, short of the actual code, of the sequence scripts for each step in the menu structure. Detailed actual coding is not provided as one skilled in the art would know how to program and implement the interface of the present invention given the level of detail disclosed.

To the user, such as a child, the companion telecommunicator appears to talk naturally, prompting the user with options. By simply squeezing the companion telecommunicator, the user places a call, makes emergency contact, records reminders and saves phone numbers. Call lists maintained by the companion telecommunicator processor are updated and sorted automatically, chronologically or according to popularity, with most recent or most frequently called numbers at the beginning. The companion telecommunicator tells the user that someone is calling by announcing the caller's name, or with a customized greeting, or with a standard telephone ring, a melody or by vibrating.

Figure 4:
FIG. 4 is, in side elevation view, a companion telecommunicator of the present invention clipped onto a child's clothing.

As seen in FIG. 4, companion telecommunicator 100 attaches to the clothes of a user 102 or for example to a user's backpack (not shown) for transport by the resilient clamping together of the hands 106. The companion telecommunicator may also have loops (not shown) that will attach to key rings or clips for easy transport.

Figure 5:
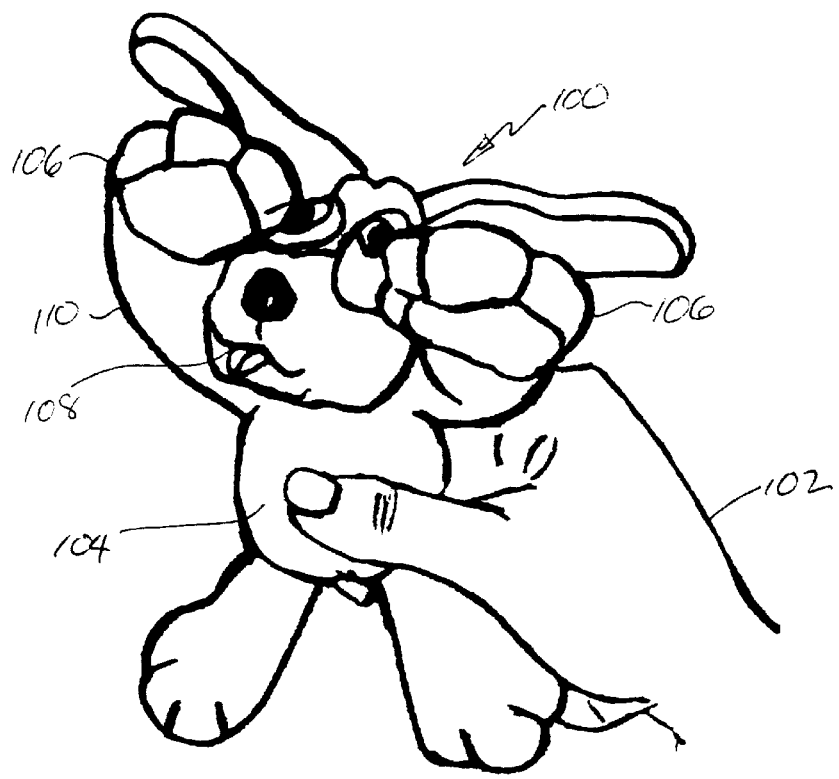
FIG. 5 is, in perspective view, a user squeezing, so as to operate, the companion communicator of the present invention.

After long periods of inactivity, companion telecommunicator 100 will go dormant. Companion telecommunicator 100 is woken up by squeezing its tummy 104 as seen in FIG. 5 gently for three seconds. Companion telecommunicator 100 greets user 102 then audibly broadcasts that it is in stand-by, speaking or whisper mode. Companion telecommunicator 100 may be intentionally made dormant or "put to sleep" by gently squeezing tummy 104 for three seconds. Companion telecommunicator 10 counts down "three", "two", "one" then says "good-bye". Squeezing for three seconds will not however put the companion telecommunicator to sleep during a conversation or while announcing a call.

Figure 6:
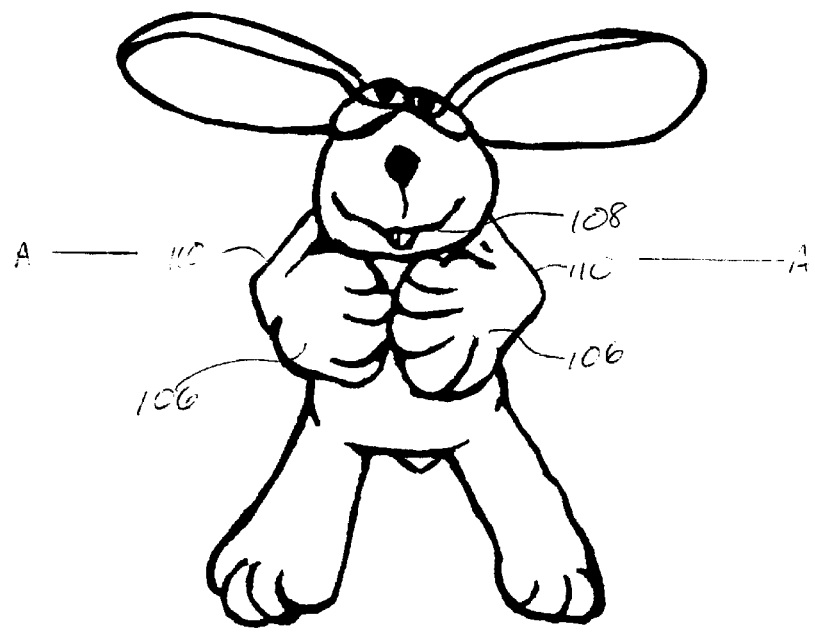
FIG. 6 is, in front elevation view, the companion communicator of FIG. 5 in stand-by mode.

When companion telecommunicator 100 is in stand-by mode, it is ready to receive calls. User 102 can ensure that companion telecommunicator 100 is awake by giving it a gentle shake. If it giggles, it's awake. The companion telecommunicator's hands 106 are positioned as if clapping to put it in stand-by mode, as seen in FIG. 6. Thus companion telecommunicator 100 can hold on to user 102 while in stand-by mode as seen in FIG. 4.

Figure 7:
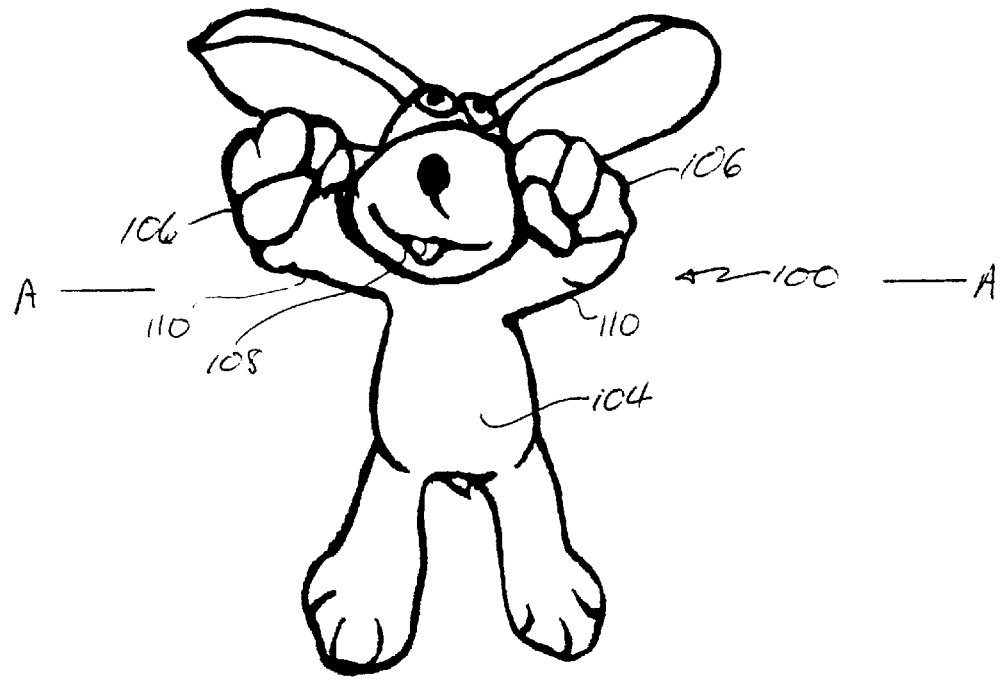
FIG. 7 is, in front elevation view, the companion communicator of FIG. 6 in whisper mode.

Whisper mode is for private conversations. In whisper mode, the audible volume is lowered so that user 102 may hold the microphone 108a embedded in, for example, the mouth 108 of companion telecommunicator 100 near to the user's ear. Companion telecommunicator 100 is put into whisper mode by lifting arms 110 out of plane A so that it looks like companion telecommunicator 100 is whispering as seen in FIGS. 5 and 7. Mouth 108 of companion telecommunicator 100 is brought to the user's ear so that the user can listen for directions.

Figure 8:
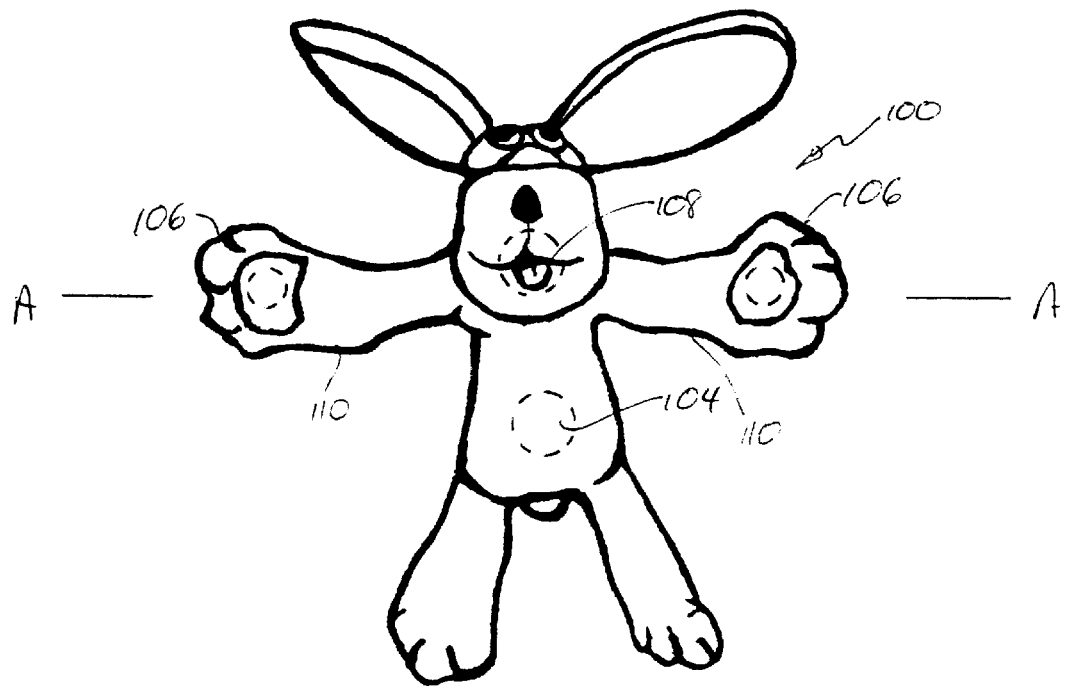
FIG. 8 is, in front elevation view, the companion communicator of FIG. 7 in broadcast mode.
Figure 9:
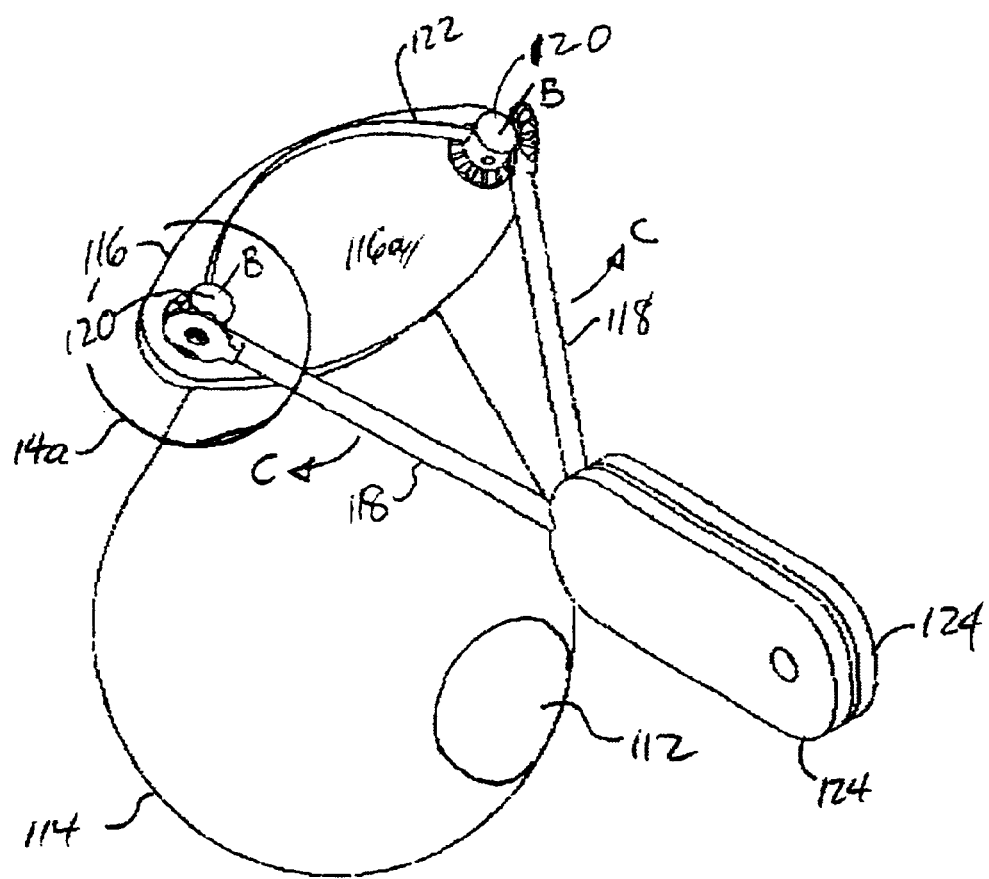
FIG. 9 is, in perspective view, the processor housing and endoskeleton of the companion telecommunicator of FIG. 4.
Figure 10:
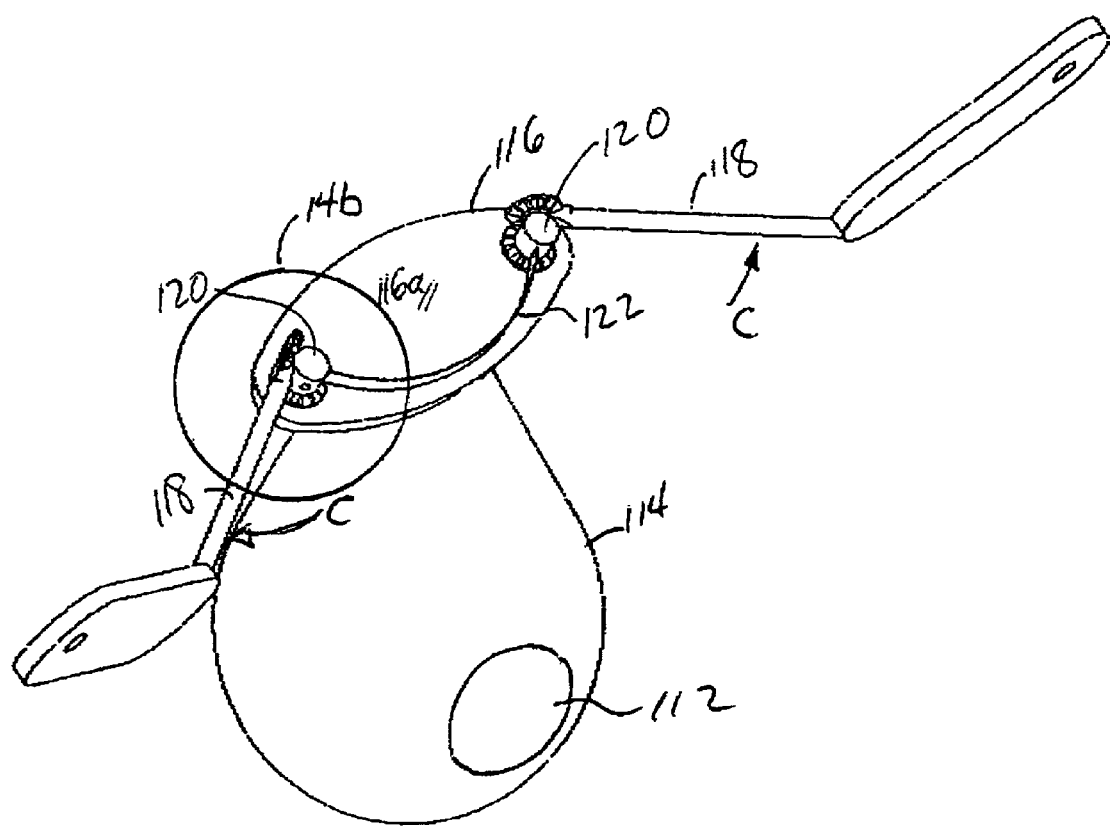
FIG. 10 is the housing and endoskeleton of FIG. 9 with the arm structure in speak mode.
Figure 11:
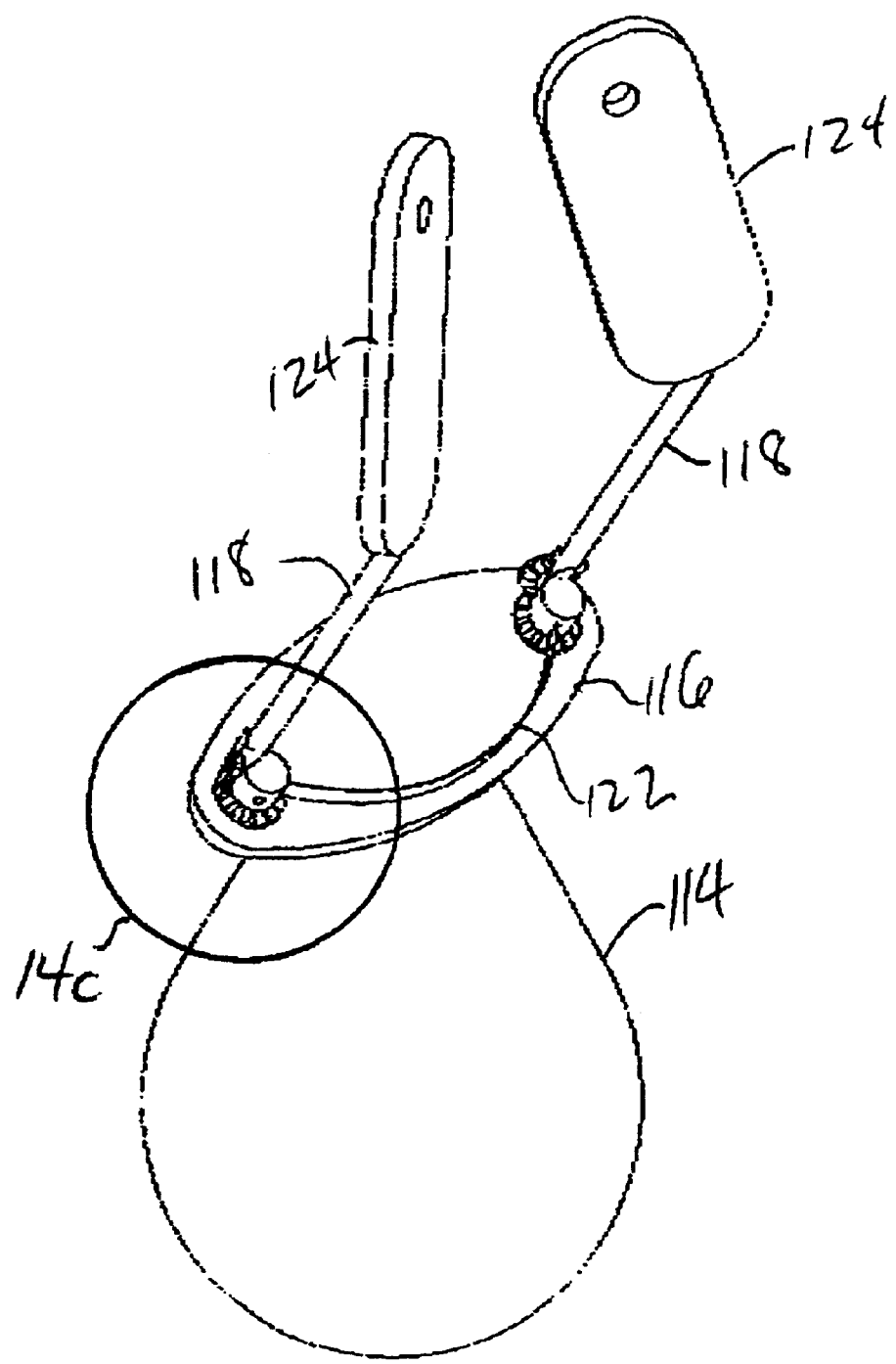
FIG. 11 is the housing and endoskeleton of FIG. 10 with the arm structure elevated into the whisper mode.
Figure 12:
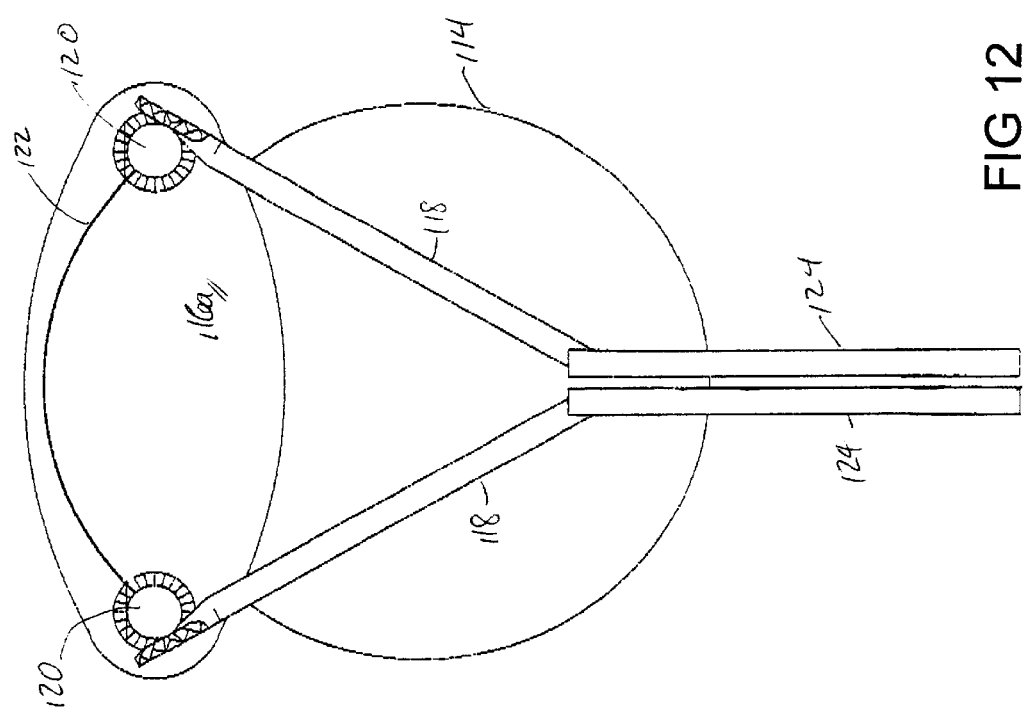
FIG. 12 is, in plan view, the housing and endoskeleton of FIG. 9.

Speaking Mode allows the companion telecommunicator to speak loudly so that the audible directions can be heard by a group of people. Companion telecommunicator 100 is placed into speaking mode by opening the arms 110 as seen in FIG. 8. In speaking mode the arms have been rotated in plane A from the clapping position to the spread apart position.

To use companion telecommunicator 100, all user 102 has to do is hold the companion telecommunicator, listen and squeeze tummy 104. This depresses an internal push-button switch 112 mounted in rigid processor housing 114 seen in FIGS. 9–14. When the companion telecommunicator speaks via microphone 108a, the user squeezes tummy 104 so as to depress switch 112 to tell the companion telecommunicator what the user wants. When the companion telecommunicator is in whisper or speaking mode, it talks to the user. To make a selection, the user squeezes the companion telecommunicator while if s talking, or during the moment before the next selection.

The companion telecommunicator uses a 3.6 volt lithium ion battery (not shown). If the battery is getting low the companion telecommunicator will periodically say "low battery". This alarm will increase in frequency as the battery power gets lower.

Companion telecommunicator 100 uses a mechanical endoskeleton mounted within the arms and body of the telecommunicator so as to transmit the arm position information to the processor (not shown) housed within processor housing 114. A shoulder or shelf 116 is mounted onto or otherwise formed on the upper end of housing 114. As better seen in FIG. 13, shoulder 116 has an upper planar surface 116a on which are pivotally mounted a pair of arm struts 118. Planar surface 116a is parallel to plane A in which arm struts 118 rotate on stub shafts 120. Rotation of stub shafts 120 about axes of rotation B transmits the arm position information via a position sensor (not shown) to the processor within housing 114. Leaf spring 122 rigidly mounted between stub shafts 120 resiliently biases arm struts 118 into either the closed position of FIGS. 9 and 12 wherein hand paddles 124 mounted on the distal ends of arm struts 118 are resiliently clamped together or the speaking mode open position of FIG. 10 wherein arm struts 118 are rotated in direction C into their fully spread apart position.

As better seen in FIGS. 14a–14c and FIG. 15, arm struts 118 are themselves pivotally mounted to stub shafts 120 for rotation relative to stub shafts 120 about axes of rotation D on stub axles 126. Rotating arm struts 118 about axes D allows movement of the arms out of plane A so as to put the arms into the whisper mode position of FIG. 11.

Rotation of arm struts 118 about axes D rotates bevel gears 118a on arm struts 118 in meshing engagement with crown gear 120a on stub shafts 120. Thus, irrespective of the rotational position of stub shafts 120, elevating and lowering arm struts 118 rotates crown gears 120a thereby signaling to the processor the vertical position information of arm struts 118. Stub shaft 120 is mounted by means of pin 126 shown exploded radially outwardly in FIG. 15. Thus contrasting FIGS. 14b and 14c, although between the two figures the rotational position of stub shaft 120 has not changed, the arm strut 118 has been elevated in FIG. 14c thereby rotating crown gear 120a relative to stub shaft 120.

Figure 16:
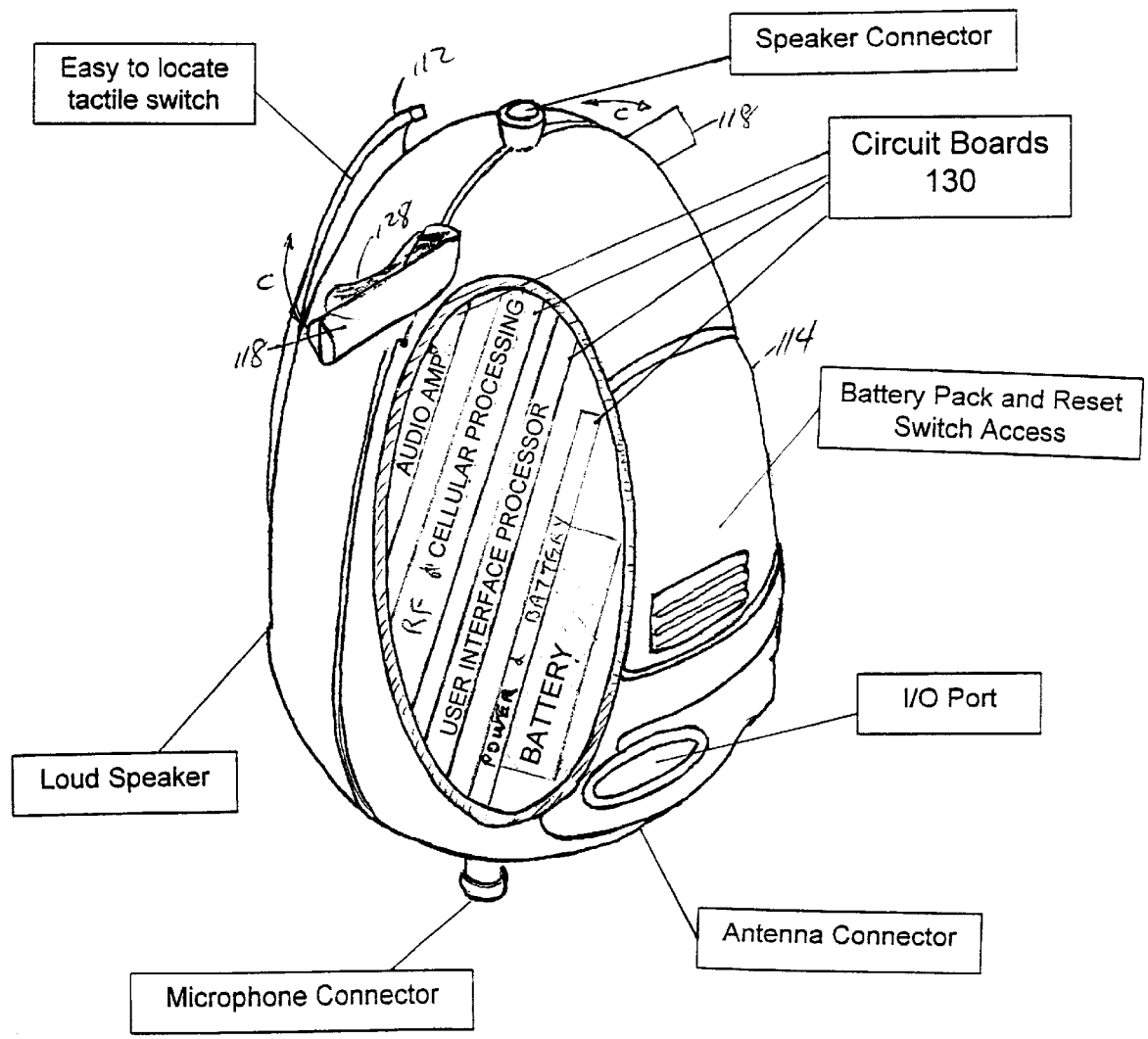
FIG. 16 is, in partially cut-away perspective view, an alternative embodiment of the processor housing with the housing and endoskeleton partially cut-away.

An alternative embodiment is illustrated in FIG. 16 in which, as labeled, all of the various components are built into the processor housing with the exception of a remote speaker and microphone for which only the respective connectors are illustrated.

The housing 114 is enlarged so as to enclose shoulder 116, the gear ends of arm struts 118, the gears, etc. Consistent with all embodiments of housing 114, the circuit boards 130 containing the processors, the power supply, and the audio amplifier are all contained within the egg-shaped housing, tilted for example as illustrated so as to optimize use of the interior space of the housing. Arm struts rotate relative to the housing in cut-out channels 128.

The audible menu for the companion telecommunicator works like a menu tree. Every choice made by the user leads to more choices until the function that the user wants is presented. Some prompts appear in more than one menu.

When the companion telecommunicator asks "what would you like to do?" the user has several choices. Each choice performs a specific function or presents more options. The choices are presented in the following order: "Present Lists", "Enter A Number", "Play Sound Clips", "Record Sound Clip", "Provide Status Information", and "Set Preferences". The choices are audibly repeated by the companion telecommunicator sequentially several times. If the user does not make a choice, the companion telecommunicator returns to stand-by mode.

The "Present Lists" choice lists stored phone numbers to call. The stored telephone numbers are sorted for presentation depending on the type of list selected. The choices are "Personal Call List", "Emergency Call List", "Incoming History List" and "Outgoing History List". The Personal Call List is automatically updated, according to frequency of use. The Emergency Call List presents the most important numbers first. The Incoming History List is updated according to the last number that called the companion telecommunicator. The Outgoing History List sorts the user's calls, starting with the most recent number.

The "Enter a Number" choice guides the user through telephone number entry and lets the user add the number to the phone list.

The "Sound Clip" choice lets the user record, play back or delete sound clips. Sound clips may be recorded during conversations, as reminders or transferred from the network or the user's home computer.

The "Provide Status Information" choice announces the user's phone number and the time and date, then tells the user if there are messages waiting, and reports battery level, signal strength, roaming status, available memory, and the like.

The "Set Preferences" choice customizes the way the companion telecommunicator responds and presents information.

The user can cancel any choice and return to the previous menu at any time by squeezing the companion telecommunicator three times.

Any time the user needs assistance on a particular menu item, the user squeezes the companion telecommunicator's hand 106 when the user is in that part of the menu. A sensor in the hand triggers the processor provide context sensitive audible help prompts.

To answer a call in Whisper Mode, the user lifts the companion telecommunicator's hands 106 to mouth 108, then places companion telecommunicator 100 near the user's ear. To answer a call in Speaking Mode, user 102 opens the companion telecommunicator's arms 110. The volume is automatically increased so as to be loud enough for a group of people to hear the conversation.

To terminate a call, user 102 places the companion telecommunicator in stand-by mode by closing arms 110.

For the user to place a call using Enter A Number menu:
1. The user places the companion telecommunicator in Whisper or Speaking Mode.
2. When the companion telecommunicator says "enter number", the user squeezes once.
3. The companion telecommunicator will count from zero to nine and say "place call".
4. The user squeezes the companion telecommunicator when the user hears the right digit.
5. The user repeats Step 4 for each digit in the number the user wishes to call.
6. If the user makes a mistake, the user squeezes the companion telecommunicator twice. When the companion telecommunicator says "erase last digit entered", the user squeezes once.
7. To review the digits entered, the user squeezes the companion telecommunicator twice. When the companion telecommunicator says "review digits entered", the user squeezes once.
8. When the user has entered all the digits in the number the user wants to call, the user squeezes and holds the companion telecommunicator—or squeezes the companion telecommunicator when its says "place call". The companion telecommunicator will tell the user the number the user is calling.
9. To terminate the call, the user places the companion telecommunicator in stand-by mode.

The companion telecommunicator remembers the last number the user called and will call that number again if the user selects Place Call before entering a digit.

To place a call from the Personal Call List which allows the user to place a call and modify telephone numbers, wherein the order of this list is updated automatically, with the most frequently used numbers at the top:

1. The user places the companion telecommunicator in Whisper or Speaking Mode.
2. The user squeezes once when the user hears "Present Lists".
3. The user squeezes again when the user hears "Personal Call List".
4. The user squeezes again when the user hears the name the user wants to call.
5. The companion telecommunicator will repeat the number the user is calling.
6. To terminate the call, the user places the companion telecommunicator in Stand-by Mode.

To call the user's favourite number:

1. The user places the companion telecommunicator in Whisper or Speaking Mode.
2. The user squeezes and holds while the companion telecommunicator asks: "What would you Like To Do?"
3. The companion telecommunicator will place the call.
4. To terminate the call, the user places the companion telecommunicator in stand-by mode.

For the user to place a call from the Emergency Call List, i.e., to call a stored Emergency Services number, (the first number in this list being the user's Quick Access Emergency Number:

1. The user places the user's companion telecommunicator in Whisper or Speaking Mode.
2. The user squeezes once when the user hears "Present Lists".
3. The user squeezes again when the user hears "Emergency Call List".
4. The user squeezes again when the user hears the name the user wants to call.
5. The companion telecommunicator will repeat the number the user is calling.
6. To terminate the call, the user places the companion telecommunicator in Stand-by Mode.

For the user to place a Quick Access Emergency Call:

1. The user places the companion telecommunicator in Whisper or Speaking Mode.
2. The user squeezes once when the user hears: "Present Lists".
3. The user squeezes again when the user hears: "Emergency Call List".
4. The user squeezes and holds while the companion telecommunicator lists names.
5. The companion telecommunicator will call the user's Quick Access Emergency Number.

For a short-cut to the user's Quick Access Emergency Number, the user starts with the companion telecommunicator's arms in the Stand-by position. The user, squeezes the companion telecommunicator and raises the arms to Whisper or Speaking Mode. The companion telecommunicator will say: "Squeeze to place emergency call". The user squeezes to make the call. If the user doesn't squeeze within a few seconds, the companion telecommunicator will cancel the request.

For the user to place a call using the Incoming History List (which lets the user call one of the last 10 callers):

1. The user places the companion telecommunicator in Whisper or Speaking Mode.
2. The user squeezes once when the companion telecommunicator says: "Present Lists".
3. When the companion telecommunicator says: "Incoming History List", the user squeezes again.
4. The companion telecommunicator will list the last 10 calls for the user, starting with the most recent. The companion telecommunicator reports the telephone number, the date and time and whether or not the user answered the call. Sometimes calls will come from unknown sources, and the telephone number will not be available.
5. When the user hears the number the user wants to call, the user squeezes the companion telecommunicator once.
6. The companion telecommunicator will repeat the number the user is calling.
7. To terminate the call, the user places the companion telecommunicator in Stand-by Mode.

For the user to place a call using the Outgoing History List (which lets the user call one of the last 10 numbers called):

1. The user places the companion telecommunicator in Whisper or Speaking Mode.
2. The user squeezes once when the companion telecommunicator says: "Present Lists".
3. When the companion telecommunicator says: "Outgoing History List", the user squeezes again.
4. The companion telecommunicator will list the last 10 numbers called, starting with the most recent.
5. When the user hears the number the user wants to call, the user squeezes again.
6. The companion telecommunicator will tell the user the number the user is calling.
7. To terminate the call, the user places the companion telecommunicator in Stand-by Mode.

For the user to store a number in the user's Personal Call List:

1. The user places the companion telecommunicator in Whisper or Speaking Mode.
2. The user squeezes when the companion telecommunicator says: "Enter Number".
3. The companion telecommunicator will count from zero to nine and say: "Place Call".
4. The user squeezes the companion telecommunicator when the user hears the right digit.
5. The user repeats Step 4 for each digit in the number the user wants to call.
6. If the user makes a mistake, the user squeezes twice. When the companion telecommunicator says: "Erase Last Digit Entered", the user squeezes again.
7. To review the digits entered, the user squeezes the companion telecommunicator twice. When the user hears: "Review Digits Entered", the user squeezes again.
8. Once the user has entered all the digits in the number the user wants to call, the user squeezes twice and when the companion telecommunicator says: "Store Number", the user squeezes again.
9. The companion telecommunicator will ask the user where the user wants to store the number: Personal Call List, Favourite Number or Emergency Call List.
10. The user squeezes when the user hears the right selection.

11. The companion telecommunicator will repeat the number.
12. To record a name for the number, the user follows the instructions to Squeeze and hold while recording, and the user speaks to the companion telecommunicator.
13. The companion telecommunicator will play back the name the user recorded.
14. The companion telecommunicator will say: "Squeeze to keep this sound clip".
15. The user squeezes to save this name and number.

For the User to Store the user's Favourite Number:
1. The user places the companion telecommunicator in Whisper or Speaking Mode.
2. The user squeezes when the companion telecommunicator says: "Enter Number".
3. The companion telecommunicator will count from zero to nine and say: "Place Call".
4. The user squeezes the companion telecommunicator when the user hears the right digit.
5. The user repeats Step 4 for each digit in the number the user wants to call.
6. If the user makes a mistake, the user squeezes twice. When the companion telecommunicator says: "Erase Last Digit Entered", the user squeezes again.
7. To review the digits entered, the user squeezes the companion telecommunicator twice. When the user hears: "Review Digits Entered", the user squeezes again.
8. Once the user has entered all the digits in the number the user wants to call, the user squeezes twice, and when the companion telecommunicator says: "Store Number", the user squeezes again.
9. The companion telecommunicator will ask where the user wants to store the number: Personal Call List, Favourite Number or Emergency Call List.
10. The user squeezes when the user hears the right selection.
11. The companion telecommunicator will repeat the number.
12. To record a name for the number, the user follows the instructions to Squeeze and hold while recording, and the user speaks to the companion telecommunicator.
13. The companion telecommunicator will play back the name the user has recorded.
14. The companion telecommunicator will say: "Squeeze to keep this sound clip".
15. The user squeezes to save this name and number.

For a User to Store an Emergency Number:
1. The user places the companion telecommunicator in Whisper or Speaking Mode.
2. The user squeezes when the companion telecommunicator says: "Enter Number".
3. The companion telecommunicator will count from zero to nine and say: "Place Call".
4. The user squeezes the companion telecommunicator when the user hears the right digit.
5. The user repeats Step 4 for each digit in the number the user wants to call.
6. If the user makes a mistake, the user squeezes twice. When the companion telecommunicator says: "Erase Last Digit Entered", the user squeezes again.
7. To review the digits entered, the user squeezes the companion telecommunicator twice. When the user hears: "Review Digits Entered", the user squeezes again.
8. Once the user has entered all the digits in the number the user wants to call, the user squeezes twice, and when the companion telecommunicator says: "Store Number", the user squeezes again.
9. The companion telecommunicator will ask where the user wants to store the number: Personal Call List, Favourite Number or Emergency Call List.
10. The user squeezes when the user hears the right selection.
11. The companion telecommunicator will repeat the number.
12. To record a name for the number, the user follows the instructions to Squeeze and hold while recording, and the user speaks to the companion telecommunicator.
13. The companion telecommunicator will play back the name the user recorded.
14. The companion telecommunicator will say: "Squeeze to keep this sound clip".
15. The user squeezes to save this name and number.

For the User to Move from Incoming History List to Personal Call List:
1. The user places the companion telecommunicator in Whisper or Speaking Mode.
2. The user squeezes when the companion telecommunicator says: "Present Lists".
3. The user squeezes when the companion telecommunicator says: "Incoming History List". The companion telecommunicator will list the last 10 calls, starting with the most recent. The companion telecommunicator reports the telephone number, the date and time and whether or not the user answered the call. Sometimes calls will come from unknown sources, and telephone numbers will not be available to the user.
4. When the user hears the number the user wants to move, the user squeezes twice.
5. The user squeezes again when the companion telecommunicator says: "Move This Entry to Personal Call List".
6. To record a name for the number, the user follows the instructions to Squeeze and hold while recording, and the user speaks to the companion telecommunicator 7.
7. The companion telecommunicator will play back the recorded name.
8. The companion telecommunicator will say: "Squeeze to keep this sound clip".
9. The user squeezes to save the name and number.

For the User to Move from Outgoing History List to Personal Call List:
1. The user places the companion telecommunicator in Whisper or Speaking Mode.
2. The user squeezes when the companion telecommunicator says: "Present Lists".
3. When the companion telecommunicator says: "Outgoing History List", the user squeezes again.
4. The companion telecommunicator will list the last 10 calls, starting with the most recent. The companion telecommunicator reports the telephone number, the date and time of the call.
5. When the user hears the number the user wants to move, the user squeezes twice.
6. The user squeezes again when the companion telecommunicator says; "Move this Entry to Personal Call List".

7. To record a name for the number, the user follows the instructions to Squeeze and hold while recording, and the user speaks to the companion telecommunicator.
8. The companion telecommunicator will play back the recorded name.
9. The companion telecommunicator will say: "Squeeze to keep this sound clip".
10. The user squeezes to save the name and number.

For the User to Modify Stored Numbers:
1. The user places the companion telecommunicator in Whisper or Speaking Mode.
2. The user squeezes when the companion telecommunicator says: "Present Lists".
3. The user squeezes again when the companion telecommunicator says: "Personal Call Lists".
4. When the user hears the name for the number the user wants to modify, the user squeezes twice.
5. The user squeezes again when the companion telecommunicator says: "Modify".
6. The user squeezes again when the companion telecommunicator says: "Change Number".
7. The companion telecommunicator will count from zero to nine and say: "Store Number".
8. The user squeezes when the companion telecommunicator says the right digit.
9. The user repeats Step 8 for each digit in the number the user wants to modify.
10. If the user makes a mistake, the user squeezes the companion telecommunicator twice. When the companion telecommunicator says: "Erase Last Digit Entered", the user squeezes again.
11. To review the digits entered, the user squeezes the companion telecommunicator twice. When the companion telecommunicator says: "Review Digits Entered", the user squeezes again.
12. Once the user has entered all the digits in the modified number, the user squeezes twice. When the companion telecommunicator says: "Store Number", the user squeezes again.
13. The companion telecommunicator will repeat the new number and save it.

For the User to Modify Names for Stored Numbers:
1. The user places the companion telecommunicator in Whisper or Speaking Mode.
2. The user squeezes when the companion telecommunicator says: "Present lists".
3. The user squeezes again when the companion telecommunicator says: "Personal Call List".
4. When the companion telecommunicator says the name the user wants to modify, the user squeezes twice.
5. The user squeezes again when the companion telecommunicator says: "Modify".
6. The user squeezes again when the user hears: "Change Name".
7. To record a modified name, the user follows the instructions to Squeeze and hold to while recording, and the user speaks to the companion telecommunicator.
8. The companion telecommunicator will play back the recorded name.
9. The companion telecommunicator will say: "Squeeze to keep this sound clip".

10. The user squeezes to save the new name.

For the User to Delete Stored Numbers:
1. The user places the companion telecommunicator in Whisper or Speaking Mode.
2. The user squeezes when the companion telecommunicator says: "Present Lists".
3. The user squeezes when the companion telecommunicator says the name of the list (Personal Call List or Emergency Call List).
4. When the companion telecommunicator says the name for the entry delete, the user squeezes twice.
5. The user squeezes again when the user hears: "Modify".
6. The user squeezes again when the companion telecommunicator says: "Delete Entry".
7. The companion telecommunicator will say: "Entry Deleted".

For the User to Clear the Incoming History List
1. The user places the companion telecommunicator in Whisper or Speaking Mode.
2. The user squeezes when the user hears: "Present Lists".
3. When the companion telecommunicator says: "Incoming History List", the user squeezes again.
4. The companion telecommunicator will list all the names and numbers in the Incoming History List, then say: "Clear Incoming History List".
5. The user squeezes to clear the entire list.
6. To clear the list without listening to all the names and numbers, the user squeezes and holds when the companion telecommunicator is listing names and numbers in the Incoming History List.
7. The companion telecommunicator will say: "Clearing Incoming History List".

For the User to Clear the Outgoing History List
1. The user places the companion telecommunicator in Whisper or Speaking Mode.
2. The user squeezes when the user hears: "Present Lists".
3. When the companion telecommunicator says: "Outgoing History List", the user squeezes again.
4. The companion telecommunicator will list all the names and numbers in the Outgoing History List, then say: "Clear Outgoing History List".
5. The user squeezes to clear the entire list.
6. To clear the list without listening to all the names and numbers, the user squeezes and holds when the companion telecommunicator is listing names and numbers in the Outgoing History List.
7. The companion telecommunicator will say: "Clearing Outgoing History List".

For the User to Review Stored Numbers:
1. The user places the companion telecommunicator in Whisper or Speaking Mode.
2. The user squeezes when the user hears: "Present Lists".
3. The user squeezes when the companion telecommunicator says the right list (Personal Call List or Emergency Call List).
4. The user squeezes twice when the companion telecommunicator says the name for the number the user wants to hear.
5. The user squeezes again when the companion telecommunicator says: "Hear this number".
6. The companion telecommunicator will repeat the number the user wants to hear.

For the User to Record Sound Clips during a Conversation and to help the User to remember, the companion telecommunicator can record both sides of the conversation.

1. During a telephone call, the user squeezes the companion telecommunicator twice.
2. The user squeezes when the user hears: "Record Sound Clip".
3. The user squeezes and holds to record part of the conversation. The user lets go to stop recording.

For the User to Record Sound Clips Outside a Conversation and taking notes of anything the User wants to remember:

1. The user places the companion telecommunicator in Whisper or Speaking Mode.
2. The user squeezes when the user hears: "Record Sound Clip".
3. The companion telecommunicator says: "Squeeze and hold while recording".
4. Once the user lets go to stop recording, the companion telecommunicator will report time consumed and amount of memory remaining.

For the User to Play Back Sound Clips During Conversation and share sound clips during a conversation:

1. During a telephone call, the user squeezes the companion telecommunicator twice.
2. When the companion telecommunicator says: "Play Sound Clips", the user squeezes again.
3. The companion telecommunicator will list; Recordings, Messages, Songs, Stories and Sound Effects. The user squeezes when the user hears the right choice.
4. To skip to the next sound clip, the user squeezes during or after playback.
5. To delete sound clips, the user squeezes and holds during playback.
6. To replay the sound clip, the user clicks twice during or after playback.

For the user to play back sound clips (which lets the user play back recorded reminders or details of a conversation):

1. The user places the companion telecommunicator in Whisper or Speaking Mode.
2. The user squeezes when the companion telecommunicator says: "Play Sound Clips".
3. The companion telecommunicator will list: Recordings, Messages, Songs, Stories and Sound Effects. The user squeezes when the user hears the right choice.
4. The companion telecommunicator plays the first sound clip.
5. To skip to the next sound clip, the user squeezes during or after playback.
6. To delete sound clips, the user squeezes and holds during playback.
7. To replay the sound clip, the user clicks twice during or after playback.

With optional software and subscriptions, the user can also play back digital streams from other Curo companion telecommunicator communicators, or material downloaded from a personal computer or network broadcasts.

There are two ways for the user to change volume during a conversation. During a telephone call, the user squeezes and holds the companion telecommunicator and the volume will increase to maximum volume level, then decrease to minimum. The user lets go once the volume has reached the desired level. The user can also adjust the volume by squeezing the companion telecommunicator's ears. The user increases the volume by squeezing the right ear, and decreases the volume by squeezing the left ear. The user lets go once the volume has reached the desired level.

The companion telecommunicator has several methods of indicating an incoming call: Caller Announce, Greeting, Tone, Melody, Vibrate. In Caller Announce mode the companion telecommunicator announces the name of the caller if the caller is in the user's Personal Call List. If the name is not in the user's Personal Call List, the companion telecommunicator announces the phone number calling. If telephone number identification is unavailable, the companion telecommunicator says: "Caller Unknown". In Greeting mode, the companion telecommunicator says: "It's for you". In Tone mode the companion telecommunicator rings with normal cellular tones. In Melody mode the companion telecommunicator gets the user's attention with a musical greeting. In Vibrate mode the companion telecommunicator vibrates to alert the user to an incoming call.

The user Changes the Call Alert Selection by:

1. Placing the companion telecommunicator in Whisper or Speaking Mode.
2. Squeezing when the companion telecommunicator says: "Set Preferences".
3. Squeezing again when the user hears: "Call Alert Selection".
4. Squeezing again when the user hears the preferred selection.

There are two ways the user changes the call alert volume during an incoming call. While the companion telecommunicator is receiving a call, the user squeezes and holds. The volume will decrease to minimum volume level, then increase to maximum. The user lets go once the volume has reached the desired level. The user can also adjust the volume by squeezing the companion telecommunicator's ears. The user increase the volume by squeezing the right ear, and decreases the volume by squeezing the left ear. The user lets go once the volume has reached the desired level.

The user can choose the amount of information the companion telecommunicator will give the user during audio prompts. There are two prompt levels: Make it Brief and Tell Me Lots. For the more experienced user, the Make it Brief option gives the user short audio prompts. For the novice, the Tell Me Lots option gives the user longer, detailed audio prompts.

The Set Level of Assistance option lets the user select the information level during audio prompts. The user places the companion telecommunicator in Whisper or Speaking Mode. The user squeezes when the user hears: "Set Preferences". The companion telecommunicator will report the current prompt level. The user squeezes once to choose the other level.

The Getting Status Information option allows the user to get status information about the companion telecommunicator. The user places the companion telecommunicator in Whisper or Speaking Mode. The user squeezes when the user hears: "Provide Status Information". The companion telecommunicator announces the telephone number and time and date and tells the user if the user has messages waiting, then reports current battery level, signal strength, roaming status, memory available in minutes and seconds, the current billing rate, and balance remaining on card (optional). The user squeezes to advance to the next report.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An audio prompted telecommunication interface device using a binary state time domain multiple selection protocol comprising:

a telecommunication device housing, a processor and cooperating memory and a power supply mounted in said housing, an audio broadcaster mounted in said housing and cooperating with said processor for audibly broadcasting outside of said housing a sequenced series of audible prompts supplied by said processor to said audio broadcaster, a binary state input switch mounted in said housing for receiving binary state input from a user, said input for binary biasing of said input switch between opposite binary states in response to a single prompt of said series of audible prompts, a timer cooperating with said processor, said processor correlating said response to said single prompt with a corresponding single time domain within a sequential series of time domains timed by said timer, said processor correlating said single time domain with said single prompt and executing a single action corresponding to said single prompt according to an instruction set in said memory, wherein, if said single action is a telecommunication action, said processor executing said single action in further cooperation with a telecommunication transceiver mounted in said housing, wherein said processor, said memory, said power supply, said audio broadcaster, said input receiver, said timer and said telecommunication transceiver are hidden within, so as to not alter the external appearance of said device housing.

2. The device of claim 1 wherein said device housing has a flexible surface and said input receiver is mounted beneath said flexible surface.

3. The device of claim 2 wherein said device housing is a soft toy.

4. The device of claim 3 wherein said device housing is a plush toy.

5. The device of claim 2 wherein said device housing has an audio transmitting surface and said broadcaster is mounted beneath said audio transmitting surface.

6. The device of claim 4 wherein said plush toy has at least one appendage, said at least one appendage pivotally mounted to a body of said plush toy, said at least one appendage cooperating with said processor so that a first position of said at least one appendage relative to said body switches said processor into a stand-by mode, and a second position of said at least one appendage relative to said body switches said processor into an active mode so as to trigger said series of prompts.

7. The device of claim 6 wherein said at least one appendage is an opposed pair of elongate appendages.

8. The device of claim 7 wherein said pair of appendages pivot relative to said body between a resilient clamped, closed position wherein said appendages are adjacent, and a spread position wherein said pair of appendages are spaced apart.

9. The device of claim 8 wherein said first position is said closed position and said second position is said spread position.

10. The device of claim 9 wherein said first and second positions lie substantially in a first plane and in a third position said pair of appendages are elevated out of said first plane, wherein in said second position said audio broadcaster audibly transmits at a first audible volume and wherein in said third position said audio broadcaster audibly transmits at a second audible volume.

11. The device of claim 10 wherein said first audible volume is greater than said second audible volume.

12. The device of claim 11 wherein said pair of appendages are arms and when in said third position the ends of said arms cup a mouth of said plush toy.

13. The device of claim 12 wherein said audio broadcaster is mounted behind said mouth of said plush toy.

14. The device of claim 13 said ends of said arms are hands, and in said first position said hands are together in front of said plush toy, and in said second position said hands are widely spread apart.

15. The device of claim 4 wherein said input switch is a push-button switch.

16. The device of claim 1 wherein said series of audible prompts are prompts in a multi-level menu tree.

17. The device of claim 1 wherein said series of audible prompts comprise a sequentially audibly broadcast list of names from a list of names in said memory, wherein said single prompt is a single name from said list and said single action corresponding to said single name is to dial a telephone number, from a corresponding list of telephone numbers, corresponding to said single name.

18. The device of claim 1 wherein said input switch may be biased a plurality of times in rapid succession and the action corresponding to said single action is different depending on the number of times said input switch is biased in said rapid succession.

19. The device of claim 1 wherein said input switch is a microphone cooperating with means for detecting audible input into said microphone within said single time domain and for registering said audible input into said microphone as said input for binary biasing of said input switch.

20. The device of claim 17 wherein audio data comprising said series of audible prompts is compressed so as to increase speed of presentation of said series of audible prompts.

21. The device of claim 17 wherein said list of names are statistically ordered based on frequency of corresponding calls.

22. The device of claim 21 wherein said list names are statistically ordered based on time of said corresponding calls.

23. The device of claim 20 wherein said speed of presentation of said series of audible prompts is increased according to feedback in an adaptive feedback loop wherein said speed of presentation is increased until a level of mistakes made by said user matches a threshold level at which said speed of presentation is increased no further.

24. In an audio prompted telecommunication interface device which includes a telecommunication device housing, and mounted in said housing a processor and cooperating memory, a power supply, an audio broadcaster, a binary state input switch, a timer, and a telecommunication transceiver, a binary state time domain multiple selection protocol method comprising the steps of:

(a) audibly broadcasting outside of said housing from said broadcaster a sequenced series of audible prompts supplied by said processor to said audio broadcaster, (b) receiving binary state input to said input switch from a user, said input binary biasing said input switch between opposite binary states in response to a single prompt of said series of audible prompts, (c) timing, by said timer, a sequential series of time domains, (d) correlating, by said processor, said response to said single prompt with a corresponding single time domain within said sequential series of time domains, (e) correlating, by said processor, said single time domain with said single prompt, and (f) executing a single action corresponding to said single prompt according to an instruction set in said memory.

* * * * *